United States Patent [19]
Todd, Jr. et al.

[11] Patent Number: 5,082,975
[45] Date of Patent: Jan. 21, 1992

[54] SYNTHESIS OF HEXAHYDROLUPULONE, NOVEL FORMS THEREOF, AND ITS USE AS A SELECTIVE INHIBITOR OF CELL GROWTH AND MULTIPLICATION

[75] Inventors: Paul H. Todd, Jr.; James A. Guzinski, both of Kalamazoo, Mich.

[73] Assignee: Kalamazoo Holdings, Inc., Kalamazoo, Mich.

[21] Appl. No.: 485,996

[22] Filed: Feb. 26, 1990

Related U.S. Application Data

[63] Continuation-in-part of Ser. No. 232,289, Aug. 15, 1988, Pat. No. 4,918,240.

[51] Int. Cl.$^5$ ............................................. C07C 45/62
[52] U.S. Cl. ............................................................ 568/315
[58] Field of Search ................................. 568/316, 315

[56] References Cited

U.S. PATENT DOCUMENTS

| | | |
|---|---|---|
| 3,552,975 | 1/1971 | Worden et al. ............... 568/341 |
| 3,892,808 | 7/1975 | Mitchell ........................ 568/366 |
| 4,154,864 | 5/1979 | Grant ............................ 568/377 |
| 4,160,787 | 7/1979 | Moll et al. .................... 568/377 |
| 4,324,810 | 4/1982 | Goldstein et al. ............ 568/377 |
| 4,590,296 | 5/1986 | Cowles et al. ................ 568/341 |
| 4,778,691 | 10/1988 | Todd et al. .................. 568/377 |

*Primary Examiner*—James H. Reamer
*Attorney, Agent, or Firm*—Gordon W. Hueschen

[57] ABSTRACT

A process for making hexahydrolupulone is described which involves the separation of beta acids from a hop extract, the removal of catalyst poisons from the beta acids, the hydrogenation of the beta acids to hexahydrolupulone, and the purification of the resulting hexahydrolupulone. Its use as an inhibitor of the growth of unwanted types of cells is described, as well as preferred forms for such use.

7 Claims, 3 Drawing Sheets

SYNTHESIS OF HEXAHYDROLUPULONE, NOVEL FORMS THEREOF, AND ITS USE AS A SELECTIVE INHIBITOR OF CELL GROWTH AND MULTIPLICATION

The present application is a continuation-in-part of our prior-filed copending application Ser. No. 232,289, filed Aug. 15, 1988, now U.S. Pat. No. 4,019,240, issued Apr. 17, 1990.

BACKGROUND OF THE INVENTION AND PRIOR ART

Beta acids, also known as lupulone, are a constituent of hops, often up to 5–7%. In the normal brewing process, in which hops are added at the kettle during the boiling of the wort, they remain unconverted to useful substances except for a small percentage oxidizing to hulupones. The greater amount is either lost to the trub or deposited on the yeast, beta acids in themselves being very insoluble in beer.

Worden, U.S. Pat. No. 3,552,975, describes a process for converting beta acids into 4-desoxy alpha acids, by hydrogenolysis at a pH preferably less than 1. These in turn are oxidized to form tetrahydroalpha acids, which may be isomerized to tetrahydroisoalpha acids, or further reduced and isomerized to hexahydroisoalpha acids as shown by Worden. Both types of reduced isoalpha acids have been found useful in the making of light-stable beer.

There was, in the past, speculation that hops may have helped control brewhouse bacterial infections due to the presence of hop acids in the wort and beer. However, since the hop beta acids are not found in beer, such control, if it indeed existed, must have been due to the hop alpha acids and isoalpha acids. Beta acids are known to be highly unstable, being oxidized in the boiling wort to bitter hulupones and by themselves to deteriorate in a matter of days or hours after crystallization. This lack of stability is now shown to be overcome by conversion to hexahydrolupulone (hexahydro beta acids). Since there is a vast excess of lupulone available as a result of being discarded in the brewing process, it is a potentially cheap raw material.

Furthermore, as a derivative of a generally-recognized as safe hop extract, hexahydrolupulone can be considered negligibly toxic when ingested.

Our copending application, Ser. No. 232,289, describes a process for removal of catalyst poisons from natural beta acids, by treatment with a polyvalent metal ion other than palladium or platinum, to produce a purified aqueous beta acid solution, which purified solution is crucial to the making of hexahydrolupulone according to the present invention. In addition, the Examples of this application describe the appropriate conditions for the hydrogenation of the purified beta acids, which are distinctly different from the conditions required and described in our previous application and earlier by Worden to achieve hydrogenolysis. That objective was a totally different product, 4-desoxy alpha acids, which require the removal of an isoprenoid side chain from the beta acids by hydrogenolysis. Hexahydrolupulone does not have any side chains removed, but rather the existing isoprenoid side chains are all hydrogenated, three (3) moles of hydrogen being required for each mole of starting beta-acids. The critical hydrogenation conditions described prevent the hydrogenation of the ethylenic linkages in the ring and the reduction of the keto groups.

THE DRAWINGS

Reference is now had to the drawings for a better understanding of the invention, wherein.

OBJECTS OF THE INVENTION

Figure 1:
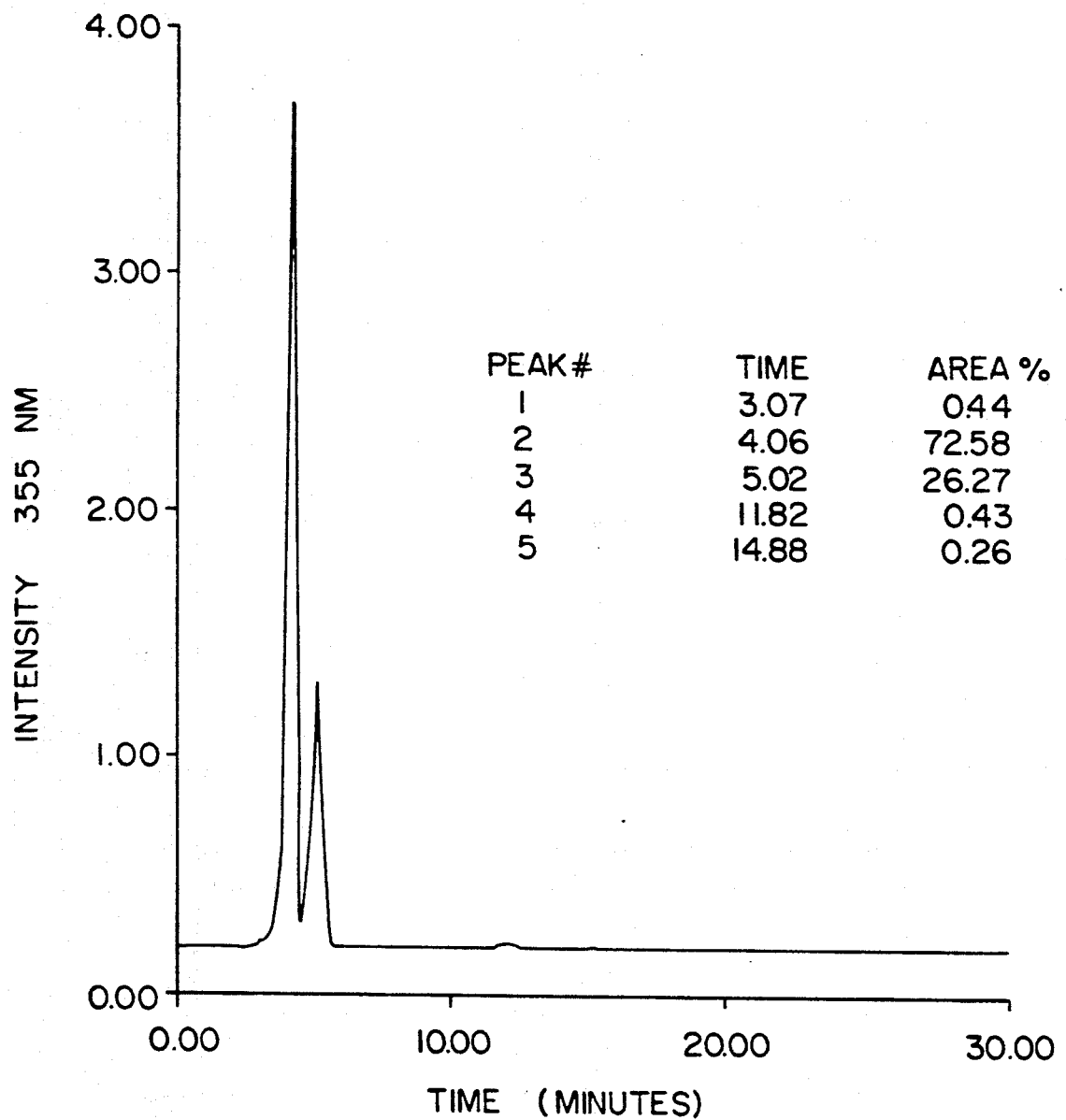
FIG. 1 is a high-performance liquid chromatography chart of the hexahydrolupulone produced by hydrogenation of beta acids at a pH of above about 4, i.e., 9, to be compared with FIG. 2, which is the same but produced by hydrogenation at a pH of 3.

It is an object of the invention to provide a new and improved process for the production of hexahydrolupulone from beta acids, as well as a novel pure and stable hexahydrolupulone product, compositions thereof, and use thereof in inhibiting the growth of certain microorgans, especially bacilli of the Lactobacillus type. Other objects will be apparent to one skilled in the art and still others will become apparent as the description proceeds.

SUMMARY OF THE INVENTION

The invention, then, comprises the following aspects, inter alia, singly or in combination:

A process for producing hexahydrolupulone which comprises of the steps of contacting beta acids in an alkaline solution with a metal oxide, hydroxide, or salt which produces polyvalent metal ions, other than platinum or palladium, optionally in the presence of a water-immiscible solvent, separating the thus-purified beta acid alkaline solution from catalyst poisons present as solids or dissolved in the optional solvent, hydrogenating the purified beta acids at a pH above 4 with hydrogen using a platinum or palladium catalyst until uptake of three moles of hydrogen per mole of starting beta acids, and recovering hexahydrolupulone from the hydrogenation medium; such a process in which the polyvalent metal ion is calcium or magnesium; such a process which the optional solvent is taken from the class consisting of hexane, limonene, and fatty alcohols; such a process in which the hydrogenation medium comprises methanol, ethanol, or isopropanol, and optionally water; such a process wherein the metal catalyst is a palladium/carbon catalyst; such a process wherein the hexahydrolupulone is recovered into a water-immiscible solvent taken from the class consisting of hexane and limonene, and the by-products present removed by extracting the solution of hexahydrolupulone with water at a pH below 12; such a process wherein the hydrogenation is carried out at a pH between 4 and 10; such a hexahydrolupulone produced in an alkaline aqueous solution, optionally containing a polyol, at a pH above about 12; such a stable, essentially pure hexahydrolupulone, produced by the catalytic hydrogenation at a pH above 4 of a beta acid solution purified from catalyst poisons, essentially free of impurities at 10.94 and 14.7 minutes, as shown by high performance liquid chromatography at a detection intensity of 355 mm.

Moreover, the addition of hexahydrolupulone to a cell culture to inhibit the multiplication of an unwanted cell type responsive thereto;

the addition of hexahydrolupulone to a yeast culture to inhibit the growth of Lactobacillus therein;

the inhibition of a Lactobacillus microorganism in the presence of yeast without inhibiting growth of the yeast by the application of a Lactobacillus-inhibiting amount of hexahydrolupulone thereto;

the inhibition of an unwanted cell growth which is responsive to hexahydrolupulone by the application of hexahydrolupulone thereto; and, also, the selective inhibition of one microorganism in the presence of another by the application of an amount of hexahydrolupulone which is inhibitory as to the one microorganism but not the other.

THE INVENTION

Beta acids, purified according to copending application Ser. No. 232,289 now U.S. Pat. No. 4,918,240, the entire disclosure of which is incorporated herein by reference, and hydrogenated to hexahydrolupulone under non-acidic conditions, and optionally purified by crystallization or partitioning, are remarkably pure and stable as compared to beta acids per se. Furthermore, it is impractical to hydrogenate them without the purification described, the catalyst poison being as destructive under hydrogenation conditions as under the hydrogenolysis conditions of our copending application directed to making 4-desoxy alpha acids.

The by-products resulting from the hydrogenation are shown to be removed by separation of a non-polar solvent in which the product is dissolved, such as hexane, from an aqueous solvent, which retains the impurities. The product may also be recovered by crystallization.

The resulting pure hexahydrolupulone is useful as a growth inhibitor in such forms as a stable alkaline solution in water and/or polyols such as glycerine or propylene glycol, or as a crystalline substance.

The following examples will demonstrate the preparation of purified beta acids, their hydrogenation, the purification of hexahydrolupulone, and the preparation of efficacious alkaline solutions thereof. The utilization of these preparations in inhibiting cell division is also shown. The stability of hexahydrolupulone, as compared to lupulone, is also shown.

The following examples will demonstrate the invention in a form in which it can be practiced by one skilled in the art, as well as show the critical limitations under which it can be practiced.

TABLE OF EXAMPLES

Example 1. The removal of catalyst poisons so as to achieve a pure hexahydrolupulone in acceptable yield.

Example 2. Critical conditions of hydrogenation, so as to avoid the 4-desoxy alpha acids of the prior art.

Example 3. Conditions critical to the hydrogenation.

Example 4. Improved stability of hexahydrolupulone as compared to lupulone, especially in pure impurity-free form as produced by hydrogenation of beta acids at a pH above about 4 according to the present invention.

Example 5. Preparation of a stable liquid form of hexahydrolupulone, which is convenient for adding to a medium for the inhibition of cell growth.

Example 6. The inhibition of cell growth using hexahydrolupulone.

EXAMPLES

The following Examples are given by way of illustration only, but are not to be construed as limiting.

Example 1

Removal of Catalyst Poisons

The method of removing palladium and platinum catalyst poisons from a beta acid solution comprises the step of agitating an aqueous alkaline solution of beta acids at a pH of at least about 10 in the presence of a polyvalent metal oxide, hydroxide, or salt providing polyvalent metal ions other than palladium or platinum and separating the insoluble materials containing catalyst poisons from the aqueous beta acid solution.

Preferred and optional methods of performing this removal of poisons are described in our copending Application No. 232,289 now U.S. Pat. No. 4,918,240. One such preferred method is to utilize beta acids which have been separated from alpha acids and non-acidic resins and essential oils present in a hexane or carbon dioxide extract or other solvent extract of hops, which beta acids are present as an alkaline solution at a pH of about 12.5 and in a concentration of about 10% to 15%. To this solution is added about 2% by volume of a mixture of about 2.5 parts of a C-10/C-14 fatty alcohol, such as is derived from palm oil, and limonene, which is derived from orange oil. The mixture is agitated, and about 2.5% by volume of a 5% MgCl2 solution is slowly added with agitation, and the mixture agitated three hours. The oil and solids are separated from the aqueous layer, and the procedure of adding the mixed organic solvent and MgCl2 repeated preferably twice more, and more if the beta acid solution contains excessive amounts of poison. The depoisoned beta acid solution is then mixed with about an equal volume of hexane, and the beta acids are recovered into hexane by slow acidification with agitation, using preferably phosphoric acid, until a pH of about 9.5-9.8 is reached. Substantially all of the beta acids are removed from the aqueous phase by this procedure.

The thus-purified beta acids may then be recovered from the hexane by partial evaporation and cooling, or by removal of the hexane under vacuum. Both procedures for recovery of beta acids are known to the art. What was not known prior to the copending application was that catalyst poisons were present in the crude beta, and that these were not separated by crystallization of the crude beta acids from hexane. Pure beta acids are very unstable, as will be shown subsequently, and this is why repeated recrystallization is not a feasible manner of reducing the level of catalyst poisons from beta acids. Other variations for removing catalyst poisons are shown in the copending application, and will be found adaptable to wide variations in operating conditions available in a given facility. For example, calcium or even zinc can replace magnesium, or the purification can be performed without a solvent present, or using oxides or hydroxides rather than a salt such as the chloride, or using hexane or methylene chloride as a solvent.

In general, this purification procedure involves the following, singly or in combination:

A method for the removal of palladium or platinum catalyst poisons from a beta acid solution containing the same, consisting essentially of the step of agitating an aqueous alkaline solution of beta acids at a pH of at least about 10, in the presence of a metal oxide, hydroxide, or salt which provides polyvalent metal ions other than palladium and platinum, and separating insoluble materials containing catalyst poisons from the aqueous beta acid solution; such a method wherein the polyvalent metal ions are selected from the group consisting of calcium and magnesium ions; such a method which is conducted in the essential absence of organic solvent; such a method which is carried out in the presence of a food-grade organic solvent of natural or synthetic origin; such a method in which the solvent is a non-chlorinated solvent; such a method in which the solvent is a hydrocarbon solvent; such a method wherein the procedure is repeated more than once with removal of insoluble material each time; such a method wherein the procedure is carried out at a pH above about 10.5 and below about 12.9; such a method wherein the procedure is carried out at a pH above about 11 and below about 12.9; such a method wherein the metal ions are provided in the form of magnesium chloride $MgCl_2$, calcium chloride $CaCl_2$, magnesium hydroxide $Mg(OH)_2$, or calcium hydroxide $Ca(OH)_2$; such a method in which the purified beta acids are recovered by precipitation from a solvent-free purified aqueous beta acid solution by reducing the pH using carbon dioxide or an edible mineral or organic acid; such a method in which the purified beta acids are recovered from the aqueous solution into a food-grade solvent by reducing the pH in the presence of a food-grade solvent; such a method in which the purified beta acids are recovered from the aqueous solution by salting out; such a method in which the metal ions are edible polyvalent metal ions.

EXAMPLE 2

Hydrogenation of Beta Acids, With and Without Removal of Catalyst Poisons

An aqueous alkaline (pH 12.5) solution of beta acids, from which the alpha acids and non-acidic resins had been removed, was divided into two parts. The first part was recovered into hexane at a pH of 9.8, and the second part was treated as in Example 1 to remove catalyst poisons, and then recovered into hexane at a pH of 9.8. Any excess base was then removed by agitating the hexane solution with water at a pH of about 8. The hexane was removed from both beta acid solutions, to give solid beta acids, the first portion containing catalyst poisons, and the second portion being depoisoned.

From each portion, twenty (20) g of beta acids were dissolved in 80 ml of methanol and four (4) ml of water. One (1) g of 5% palladium on carbon combined with one (1) ml of water was added, the vessel evacuated, hydrogen at twenty (20) p.s.i. connected to the vessel, the vessel was shaken in a Parr apparatus until hydrogen uptake ceased (one hour for uptake of approximately three (3) moles of hydrogen per mole of starting beta acids in the case of the depoisoned beta acids) or for four hours in the case of the crude beta acids. In the latter case, hydrogen was not absorbed due to the poisons, so no hexahydrolupulone was formed.

The hexahydrolupulone, made by hydrogenation of the depoisoned beta acids, was filtered to remove the catalyst. Then 100 ml of water and 100 ml of hexane were added, the mixture agitated, and the hexahydrolupulone was recovered into the hexane phase. About fifty (50) ml of the hexane was evaporated, the mixture seeded, cooled to about 4 degrees C, and the hexahydrolupulone allowed to crystallize. A yield of 50-60% of essentially pure product is obtained from the first crop, and an overall yield of 85% to 95% can be achieved with subsequent cropping.

Platinum may replace palladium as catalyst in the foregoing hydrogenation step.

EXAMPLE 3

Conditions Critical to the Hydrogenation

The hydrogenolysis described in our copending application utilizes a pH of about 1 or less to transform the beta acids to 4-desoxy alpha acids. A substantially higher pH is necessary if the beta acids are to be converted to pure hexahydrolupulone, the pH minimum being about 3, the preferred range above 4, and the optimum about 7 to 9. For example, the purified beta acids in hexane were agitated in one case with water at a pH of 3, and in another case at a pH of 9. The water was separated and discarded. The hexane was removed from the beta acids, which were hydrogenated as in Example 1. The pH 3 beta acids took 1½ hours to hydrogenate, the pH 9 beta acids hydrogenating (as in Example 1) in one (1) hour. At a pH of 3, substantial impurities were produced.

Although methanol is a preferred solvent for the hydrogenation because of its cost, other lower alkanols are satisfactory, as is hexane. Indeed, any relatively non-toxic, non-reactive solvent may be used.

Figure 2:
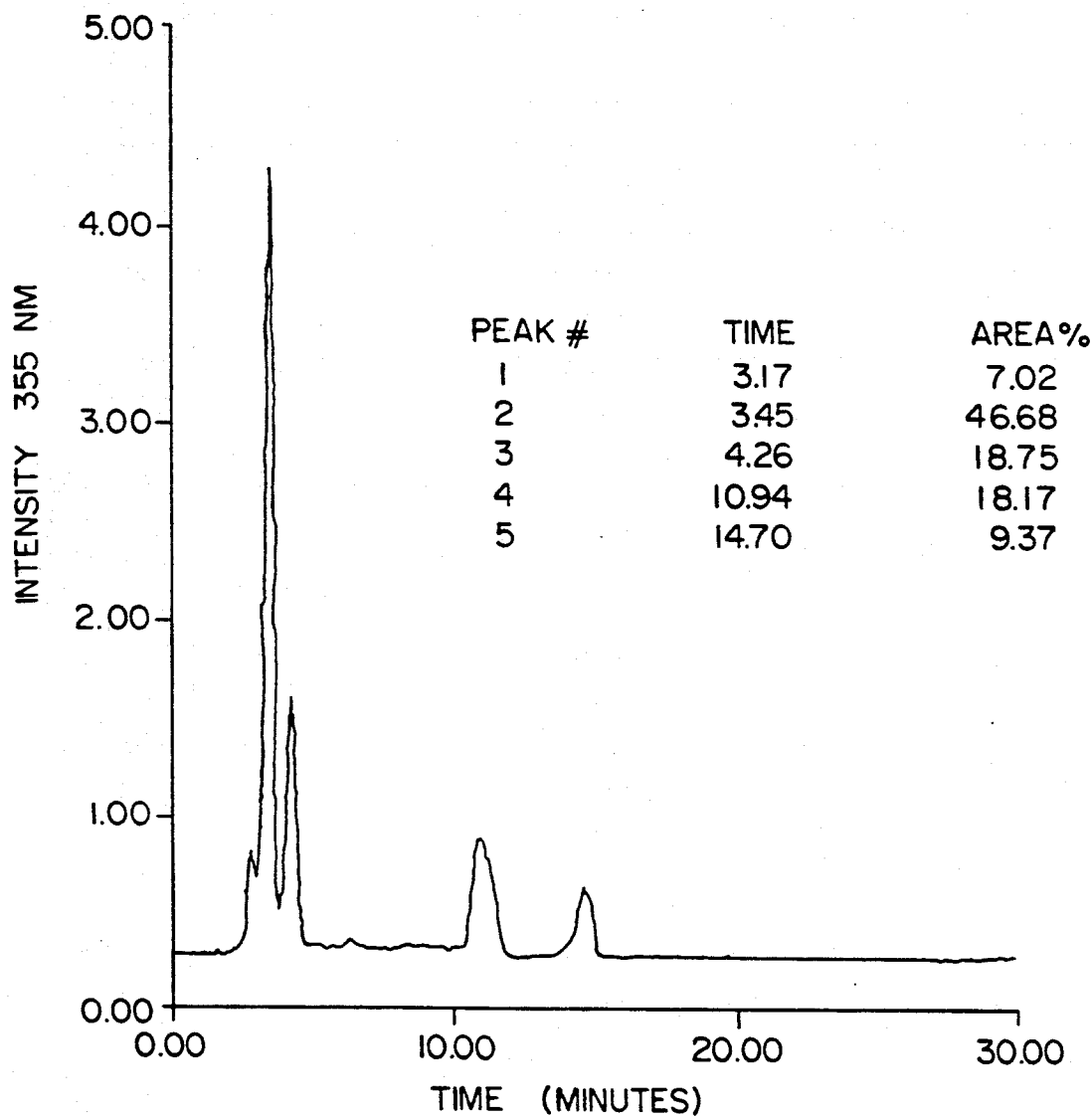

FIGS. 1 and 2 show HPLC's of the pH 9 and pH 3 hydrogenation products, and the difference in purity is pronounced.

The procedure for hexahydrolupulone (HHL) analysis by high performance liquid chromatography (HPLC) was as follows:

Ten (10) mg of crystalline HHL was dissolved in ten (10) ml of anhydrous methanol. A Varian model 5000 liquid chromatograph was used for analysis of the resulting solution.

The following were set up on the HPLC system:
Flowrate 1.0 ml/min
Detection: 355 nm
Injection Volume: 5 micro-liter
Column: Hewlett-Packard 5 micron Hypersil TM C-18 ODS (100×4.6 mm) or equivalent
Mobilephase: 0.3% potassium citrate in 70% methanol, 5.4% acetonitrile, 24.3% water (by volume), pH=7.0

The impurities are apparent at 10.94 and 14.7 minutes on the abscissa of the graph in FIG. 1.

EXAMPLE 4

Relative Stability of Beta Acids and Hexahydro Beta Acids (Hexahydrolupulone)

Figure 3:
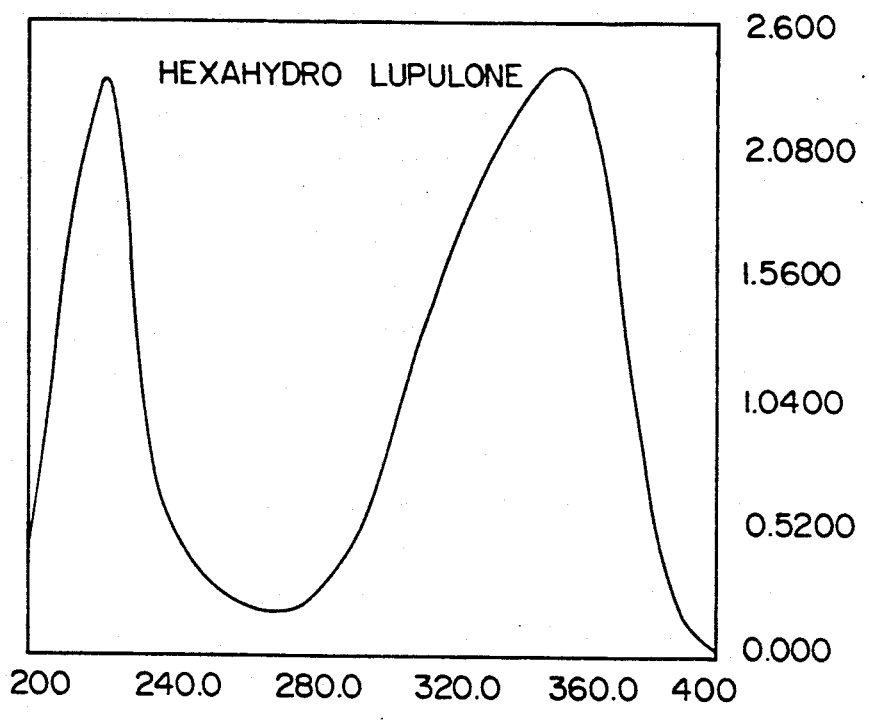
FIG. 3 is a UV scan of the ultraviolet region of the spectrum of the stable hexahydrolupulone product of the invention as compared with FIG. 4 which has a UV scan of the ultraviolet region of the spectrum for the relatively unstable beta acids, in both cases after standing for one (1) week in air.
Figure 4:
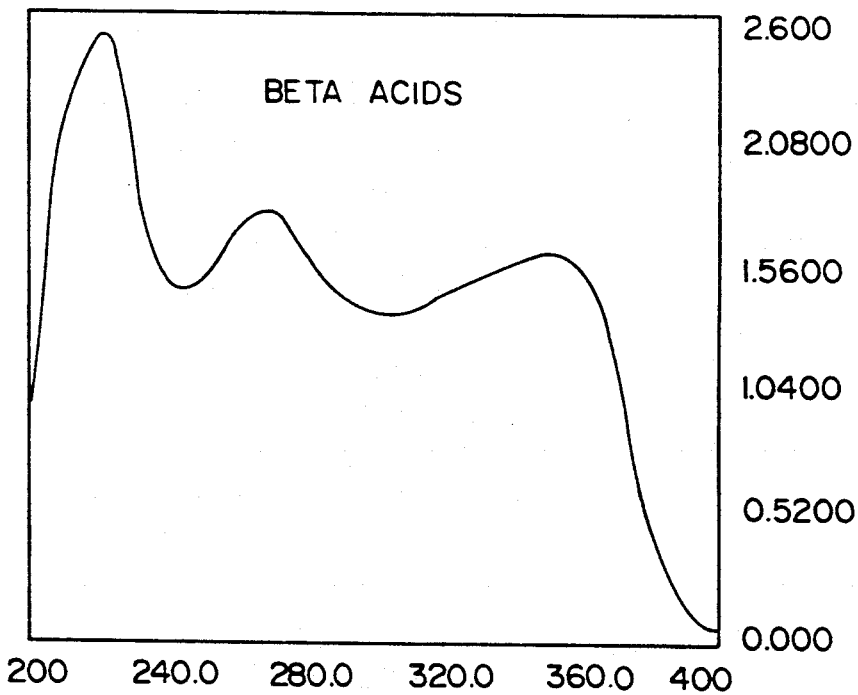

Crude, undepoisoned beta acids crystallized from hexane, and hexahydrolupulone, made as in Example 1 and crystallized from hexane, were placed on a filter paper and allowed to stand in the laboratory in a drawer for one week. The materials were then dissolved in alkaline (0.1 normal) methanol, and scans run in the ultraviolet region of the spectrum. These scans are shown in FIGS. 3 and 4. The original scan of the hexahydrolupulone was the same as that of the hexahydrolupulone after one week, which is shown. The original beta acid scan was identical to that of hexahydrolupulone, but it is obvious that after one week (the scan shown) the beta acids had become severely degraded.

It should be mentioned that this unexpected and critical improvement of stability exists in spite of the presence of the same conjugated keto-enol groups which exist in the starting beta acids. In other words, the hexahydrolupulone retains unsaturated carbon-carbon bonds in the ring, as well as conjugated keto groups on the ring and side chain, but in the purified form of the present invention is extremely and unpredictably stable.

EXAMPLE 5

Preparation of an Aqueous Liquid Alakline Solution of Hexahydrolupulone

Hexahydrolupulone was made from depoisoned beta acids as in Example 1, except that twice the amount of catalyst was used. This accelerated the rate of hydrogenation, as does raising the temperature. The methanolic solution was filtered to remove catalyst, two volumes of hexane and one volume of water added with agitation, the pH adjusted to 10 to remove any acidic contaminants, and the aqueous phase separated and discarded. To the hexane solution was added sufficient 10% KOH (NaOH is optional) to raise the pH to 13, and the aqueous phase containing the hexahydrolupulone separated. The hexane was discarded. The aqueous phase was desolventized under vacuum to remove residual hexane, and then consisted of a stable amber fluid, from which the hexahydrolupulone did not crystallize.

Alternatively, propylene glycol, glycerine, similar stable alcohols and polyols, or mixtures thereof with or without water, may be substituted for the water. In addition, the foregoing aqueous solution may be mixed with glycol or glycerine, etc., to form a standardized solution of product, which is readily-dispersible in water and which is also stable.

Example 6

The Use of Hexahydrolupulone to Inhibit Growth of Undesired Organisms

A 20% solution of hexahydrolupulone in water (about 50%) and glycerine (about 30%) was added to distilled water to make a 0.2% solution of the lupulone.

Skim milk was inoculated with a culture of Lactobacillus acidophilus, and a portion set aside as a control. To other portions of this medium were added sufficient amounts of the 0.2% solution of hexahydrolupulone to provide 50 and 200 p.p.m. in the culture. The cultures were allowed to stand at 20 degrees C. for 18 hours, and observed. The control had the consistency of yogurt and had the aroma of buttermilk, whereas the dosed media retained their original consistency and milky aroma, and had not fermented.

Similar experiments show the hexahydrolupulone to inhibit the growth of other Lactobacillus species, as well as bacilli generally, and other bacteria, but not yeast, as shown in the following paragraph.

Similar treatment of a 10% sugar solution, inoculated with yeast, did not inhibit fermentation. Accordingly, it is evident that the hexahydrolupulone solution may be used to selectively inhibit growth of specific cell lines, for example, the selective inhibition of Lactobacillus in the presence of yeast. Moreover, its use in inhibiting Lactobacillus infections in the brewhouse will become immediately apparent to one skilled in the brewing art. Other useful applications in fermentation processes, as well as pharmaceutical applications, will also be apparent to one skilled in the art.

Although the hexahydrolupulone may be used as a neutral solution in alcohol or the like, its preferred form is as a stable alkaline solution as described in Example 5

It is thus seen that the present invention provides a novel and advantageous process for the production of hexahydrolupulone from particularly purified beta acids as well as the unpredictably stable and impurity-free hexahydrolupulone product produced by such hydrogenation at a pH above pH 4, useful compositions of such hexahydrolupulone, and a method of inhibiting the growth of responsive cell cultures or microorganisms by the application of an inhibitory amount of hexahydrolupulone thereto.

Various modifications and equivalents will be apparent to one skilled in the art and may be made in the compounds, compositions, methods, and procedures of the present invention without departing from the spirit or scope thereof, and it is therefore to be understood that the invention is to be limited only by the full scope which can be legally attributed to the appended claims.

We claim:

1. A process for producing hexahydrolupulone which comprises the steps of contacting beta acids in an alkaline solution with a metal oxide, hydroxide, or salt which produces polyvalent metal ions, other than platinum or palladium, optionally in the presence of a water-immiscible solvent, separating the thus-purified beta acid alkaline solution from catalyst poisons present as solids or dissolved in the optional solvent, hydrogenating the purified beta acids at a pH above 4 with hydrogen using a platinum or palladium catalyst until uptake of three moles of hydrogen per mole of starting beta acids, and recovering hexahydrolupulone from the hydrogenation medium.

2. A process of claim 1, in which the polyvalent metal ion is calcium or magnesium.

3. A process of claim 1, in which the optional solvent is taken from the class consisting of hexane, limonene, and fatty alcohols.

4. A process of claim 1, in which the hydrogenation medium comprises methanol, ethanol, or isopropanol, and optionally water.

5. A process of claim 1, wherein the metal catalyst is a palladium/carbon catalyst.

6. A process of claim 1, wherein the hexahydrolupulone is recovered into a water-immiscible solvent taken from the class of hexane and limonene and the by-products present removed by extracting the solution of hexahydrolupulone with water at a pH below 12.

7. A process of claim 1, wherein the hydrogenation is carried out at a pH between 4 and 10.

* * * * *

UNITED STATES PATENT AND TRADEMARK OFFICE
CERTIFICATE OF CORRECTION

PATENT NO. : 5,082,975
DATED : Jan. 21, 1992
INVENTOR(S) : Paul H. Todd, Jr., James A. Guzinski It is certified that error appears in the above-identified patent and that said Letters Patent is hereby corrected as shown below:

Column 1, line 9; U. S. Pat. No. 4,019,240 should read
-- U.S. Pat. No. 4,918,240 --.
Column 3, line 23; "232,289now" should read -- 232,289 now --.
Column 4, line 21; "232,289now" should read -- 232,289 now --.
Column 6, approximately line 50; "Flowrate 1.0" should read
-- Flowrate: 1.0 --.
Column 6, line 59; "FIG 1." should read -- FIG. 2. --

Signed and Sealed this

Eighth Day of June, 1993

Attest:

MICHAEL K. KIRK

Attesting Officer

Acting Commissioner of Patents and Trademarks